E. J. MASON.
FRUIT PICKER'S BAG.
APPLICATION FILED APR. 3, 1909.
949,024.
Patented Feb. 15, 1910.
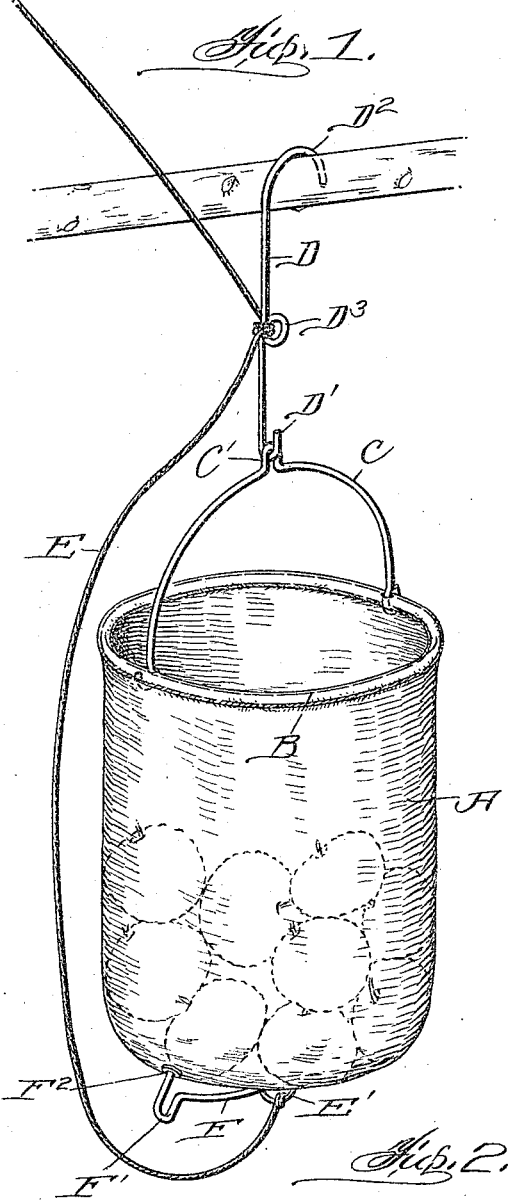
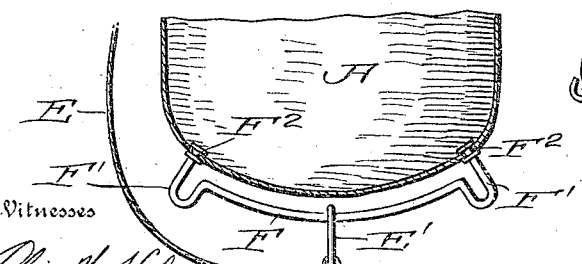
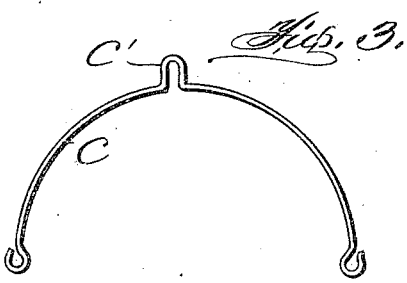
Inventor
E. J. Mason
By Chas. E. Brock
Attorney

UNITED STATES PATENT OFFICE.

EDWARD J. MASON, OF PHILADELPHIA, PENNSYLVANIA.

FRUIT-PICKER'S BAG.

949,024.  Specification of Letters Patent.  Patented Feb. 15, 1910.

Application filed April 3, 1909. Serial No. 487,634.

*To all whom it may concern:*

Be it known that I, EDWARD J. MASON, a citizen of the United States, residing in Philadelphia, State of Pennsylvania, have invented a new and useful Improvement in Fruit-Pickers' Bags, of which the following is a specification.

This invention is a new and useful construction of bag for picking fruit, together with means for suspending and emptying said bag, the object being to provide a cheap, and simple device by means of which fruit can be quickly and easily picked from the tree, and collected in the bag, without bruising, and then lowered and discharged or emptied from the bag, without injury to the fruit so collected; and a still further object is to provide a bag of such construction that it can be discharged to either the right or the left, while the picker is still upon the ladder, thereby enabling said picker to discharge the bag in any direction he desires, and without necessitating his descent of the ladder.

With these various objects in view, my invention consists in the novel features of construction, hereinafter fully described and pointed out in the claims.

In the drawing forming a part of this specification:—Figure 1 is a perspective view of a bag constructed in accordance with my invention. Fig. 2 is a detail sectional view of the lower end of the same. Fig. 3 is a detail view of the bail or handle.

In constructing a fruit picker's bag, in accordance with my invention, I employ a bag A of canvas or any other suitable material, and this bag can be made any size desired. At the top of this bag is a metal ring B, to which is pivoted a wire bail or handle C, which at the center is upset as shown at C' to provide a slot or loop into which the lower hook D' of the hanger is adapted to fit, the upper hook $D^2$ of said hanger D being intended to fit over a limb of the tree for the purpose of suspending the bag in the tree within easy reach of the picker, whom it will of course be understood is on the ladder, or otherwise elevated in the tree. The hanger D has an eye $D^3$ produced therein, intermediate the upper and lower hooks, and to this eye is connected a rope, one portion of the said rope being carried down, and connected to the bottom of the bag, as hereinafter explained, while the other and greater portion of said rope extends upwardly and is handled and controlled by the picker, and it will be understood that the length of rope will be governed by the height of the tree.

In operation the fruit is picked from the tree, and put into the bag, and when said bag is filled, the hook $D^2$ is removed from the limb and the bag lowered by the rope E, and when the bag reaches the ground the hook D' will become disengaged from the bail or handle, and then by drawing up on the rope the contents of the bag will be emptied, inasmuch as the end of the rope is connected to the bottom of the bag, and as the rope is drawn up, the bag of course becomes inverted, and is consequently emptied. Now, in order to provide for discharging the contents of the bag to either the right or the left, as may be desired, I connect the lower end of the rope E to the bottom of the bag by means of a curved guide rod F which is curved to correspond with the bottom of the bag, and adjacent each end is upset to provide recesses F', into which the ring E' carried at the end of the rope is adapted to drop, as the rope is drawn to either the right or the left, as it is desired to discharge the contents of the bag in the opposite direction. The extreme ends of the wire F are passed through the bag and headed down, washers being employed upon the opposite sides of the bag, as shown at $F^2$ in order to prevent the ends of the wire pulling out.

It will thus be seen that I provide a cheap, simple and efficient construction of picker's bag, capable of carrying out all of the objects hereinbefore mentioned.

Having thus fully described my invention, what I claim as new and desire to secure by Letters Patent is:—

1. A bag having a bail connected to the upper end thereof, a rope slidably connected at its lower end to the bottom of the bag, and a double hooked hanger connected to said rope intermediate its ends, as set forth.

2. A bag having a bail connected to the upper end thereof, said bail having a central slot or loop, a rope slidably connected at its lower end to the bottom of the bag, and a double hooked hanger connected to said rope intermediate its ends, as set forth.

3. A bag having a bail connected to its upper end, said bail having a central slot or loop, a rope, a hanger connected to said rope, and having upper and lower hooks, a guide rod connected to the lower end of the bag, and having offsets or recesses at the ends thereof, a ring adapted to slide upon said rod, the end of the rope being connected to said ring, for the purpose set forth.

EDWARD J. MASON.

Witnesses:
JAMES A. MARTIN,
CHAS. E. BROCK.